Aug. 25, 1942.                U. O. GUIGNARD                2,294,354
                          MATERIAL HANDLING DEVICE
                          Filed Nov. 29, 1940          5 Sheets-Sheet 5
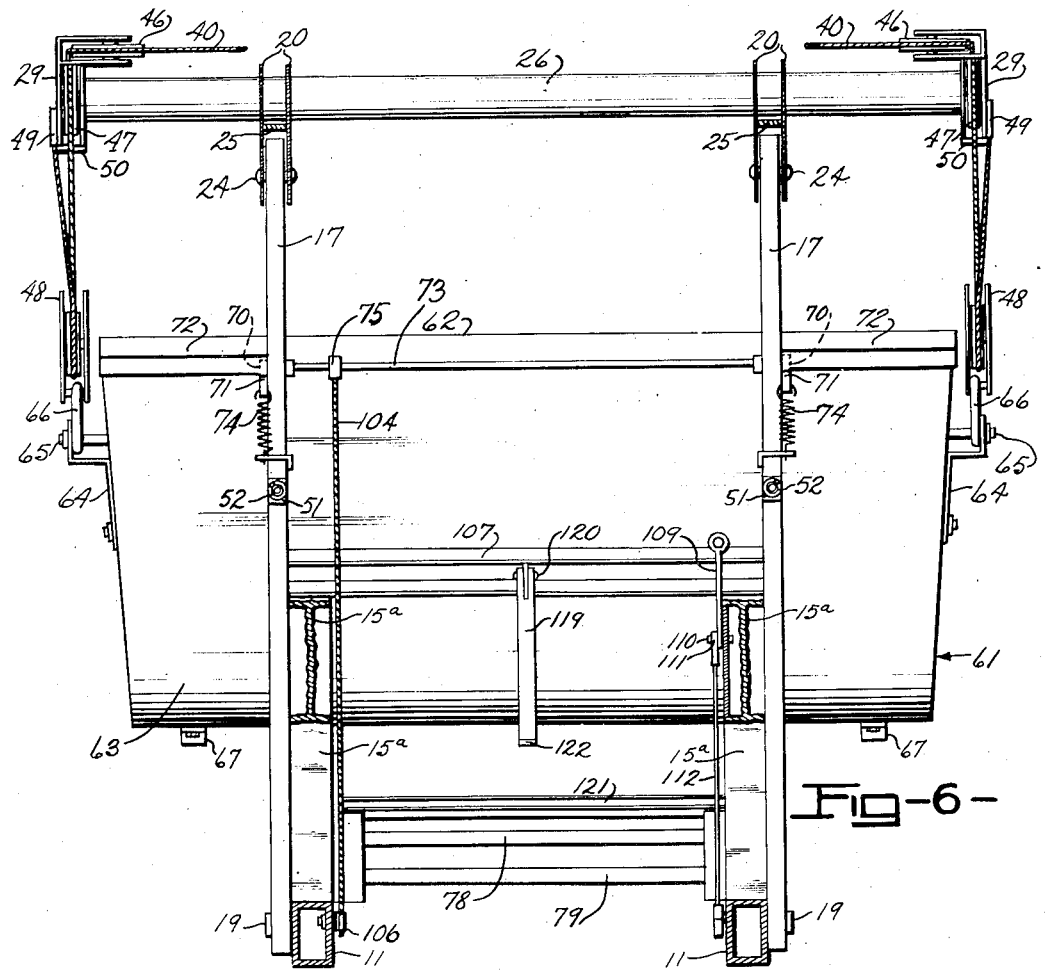
Fig-6-
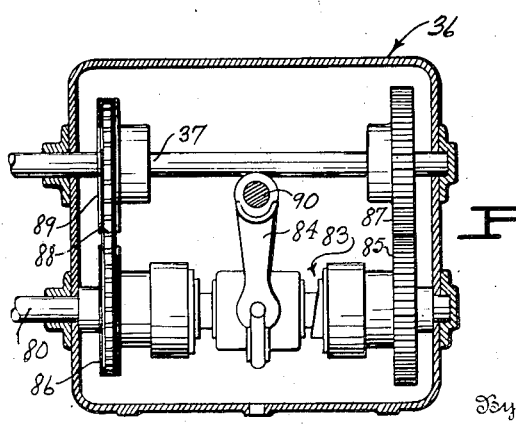
Fig-7-
Inventor
ULYSS O. GUIGNARD
Carlsen + Hazle
Attorneys Patented Aug. 25, 1942

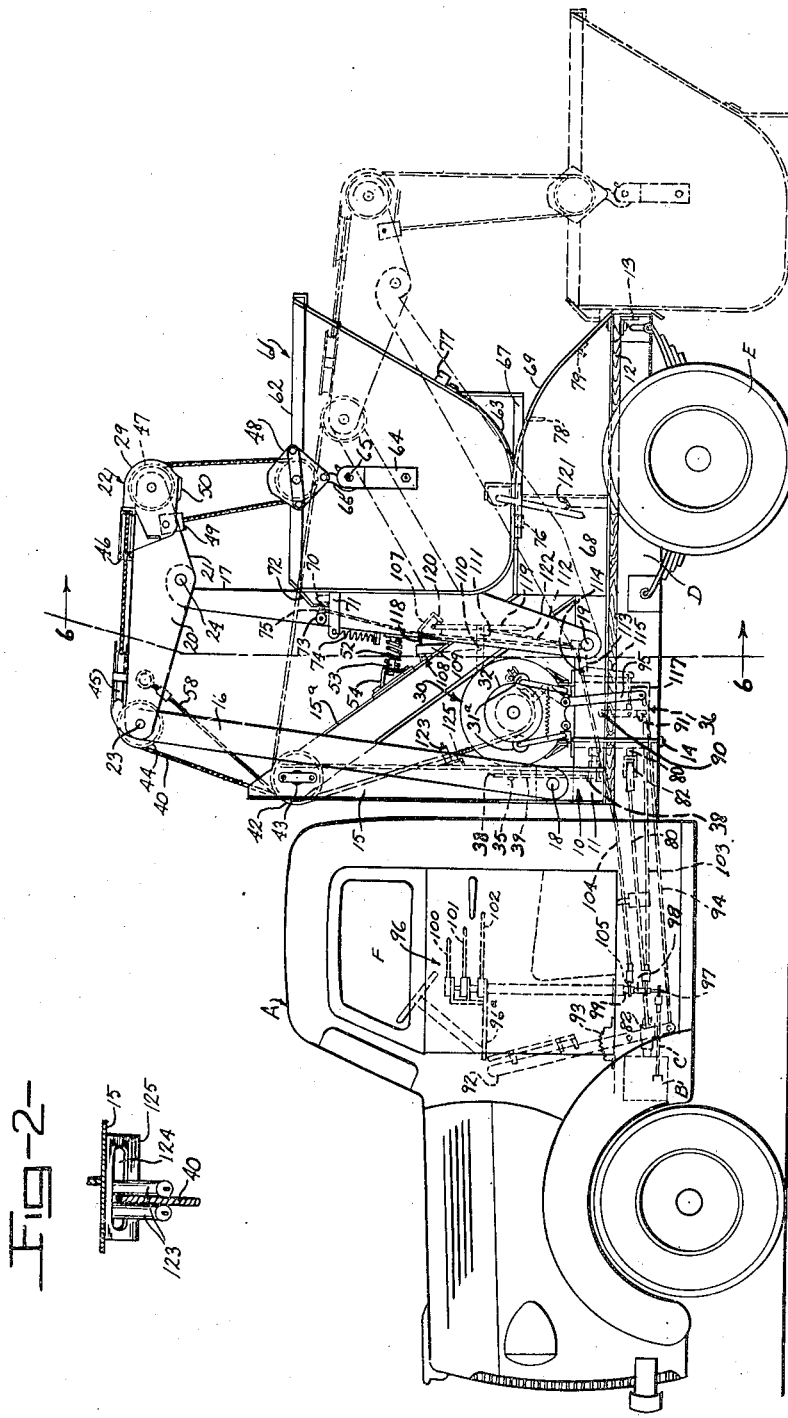

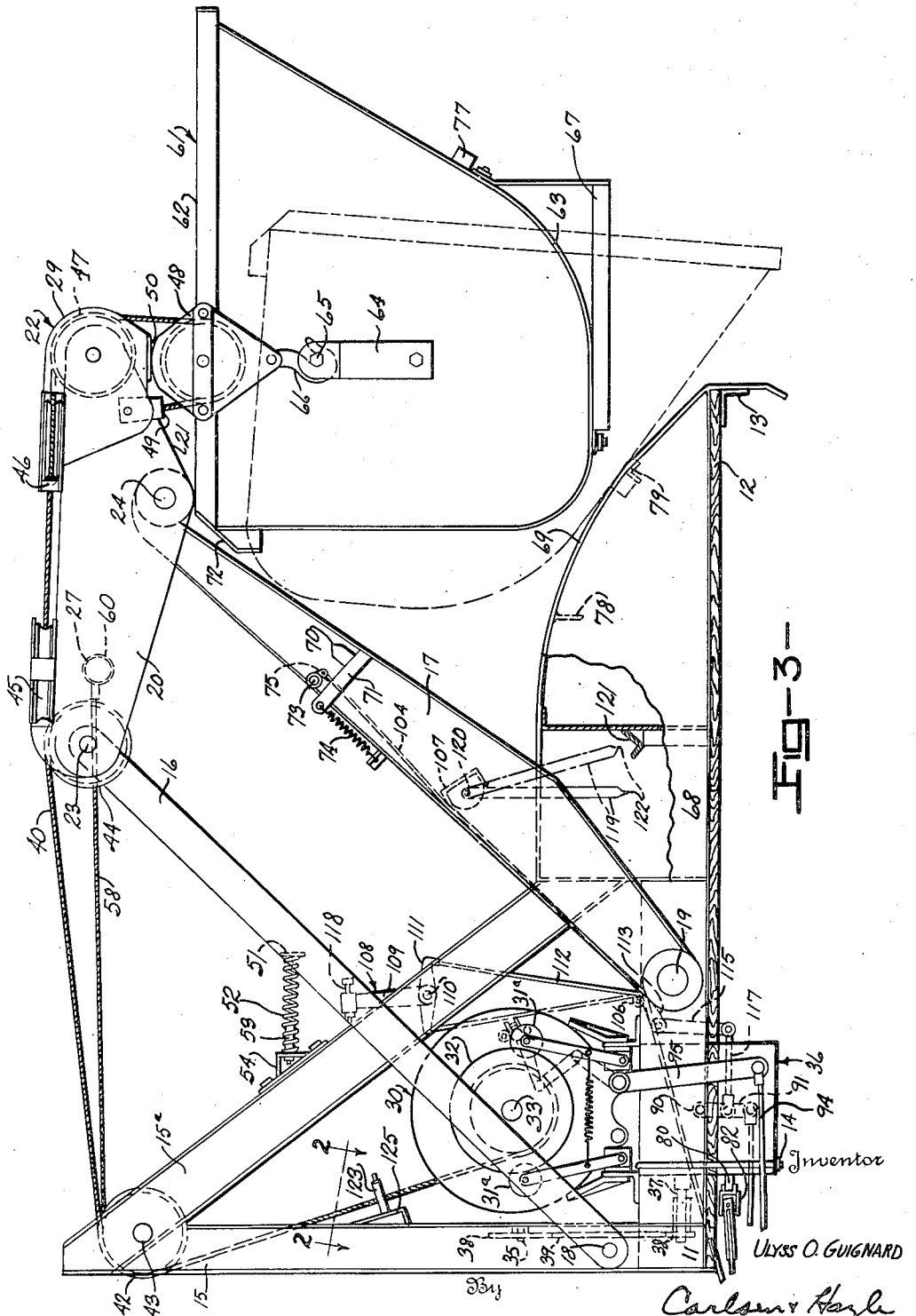

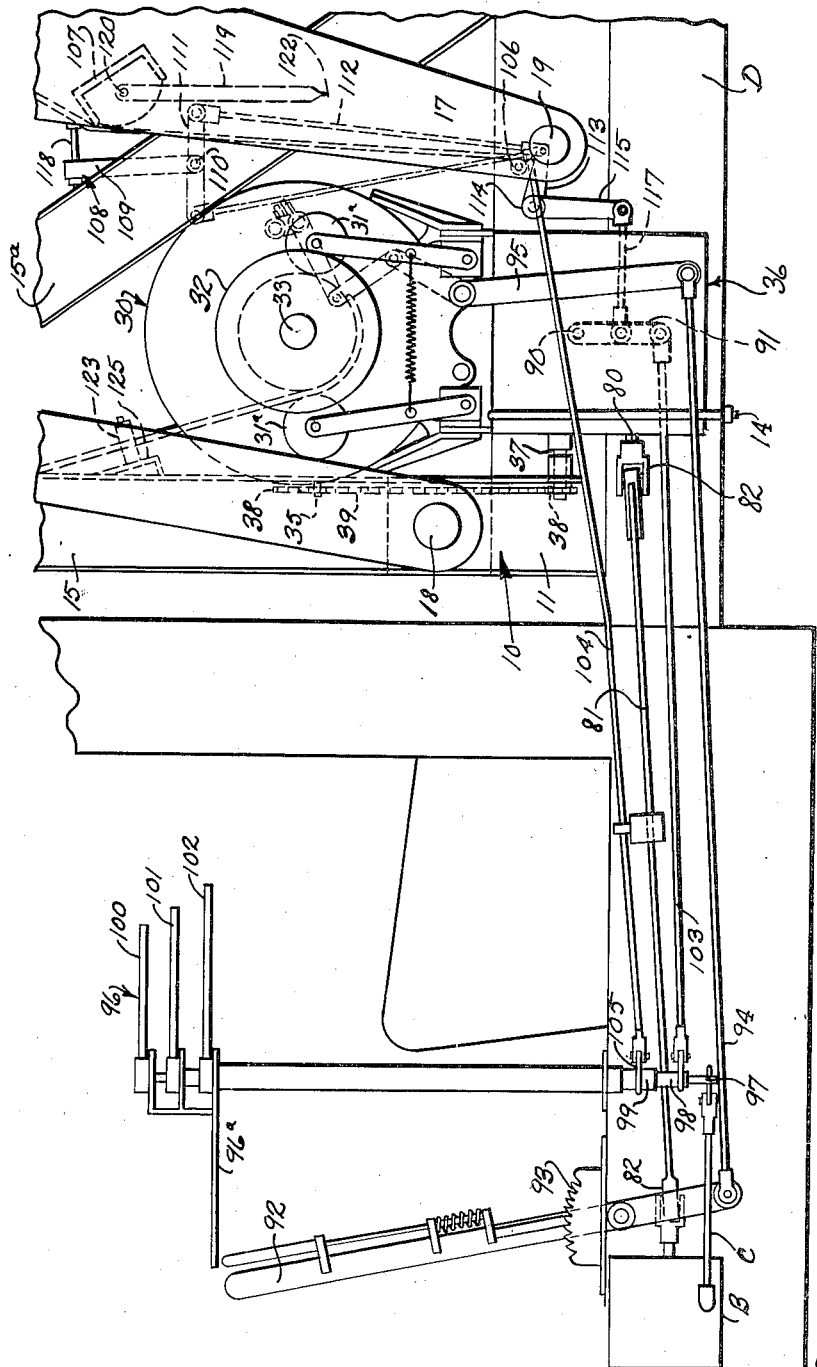

2,294,354

UNITED STATES PATENT OFFICE 2,294,354

MATERIAL HANDLING DEVICE

Ulyss O. Guignard, Minneapolis, Minn., assignor to Pioneer Engineering Works, Inc., Minneapolis, Minn., a corporation of Delaware Application November 29, 1940, Serial No. 367,783

9 Claims. (Cl. 214—77)

This invention relates to improvements in devices for loading, transporting, and dumping such heavy materials as sand, gravel, rock, ore, and the like.

The usual method of handling such materials involves the use of a power shovel for loading the material into a motor truck having a power operated dump body and, of course, such a combination of machinery, while very effective, is extremely expensive and finds its best use only when large quantities of material are to be handled.

There are, furthermore, frequently encountered situations when such machinery cannot be used due to lack of room, conditions requiring the use of as much manual labor as possible, the nature of materials to be handled, and like conditions. In cases of this kind the materials may be best handled by loading them into skips or buckets, placed at convenient points for the purpose, and then by the use of a motor truck, provided with suitable hoisting mechanism, these buckets may be lifted and transported and, at point of destination either deposited on the ground or dumped ready for return to the loading point.

The primary object of this invention is to provide a hoisting, transporting and dumping mechanism for this purpose which may be readily mounted upon a motor truck and by means of which a bucket or skip may be lifted, moved to a transport position on the truck, and then either returned loaded to the ground, or dumped and then righted for return to the ground.

Another object is to provide a mechanism of this kind which is so arranged that the loaded bucket will be lifted directly upward immediately to the rear of the truck so as to reduce or eliminate any tendency of the truck to rear up at its front end due to the action of the suspended weight of the materials, and to provide means whereby the loaded skip may be moved forwardly and deposited upon the truck in a transport position such that the center of gravity of the load will fall forwardly of the rear truck axle in accordance with best practice.

Another object is to provide a device of this kind by which a loaded bucket may be lifted or deposited from, or on, a point below the ground level upon which the truck rests. It is thus possible to lift the bucket from a ditch or other depression in the ground. The invention further provides safety means by which the even greater than normal tendency of the truck to rear up at its forward end when the truck is operated upon an incline will be counteracted and prevented.

Still another object is to provide a device of this nature having means whereby the loaded bucket may be secured in transport position but which may be released so that the bucket may, by suitable manipulation of the controls, automatically roll backward for dumping out the materials to the ground.

These and other more detailed and specific objects will be disclosed in the course of the following specification, reference being had to the accompanying drawings, in which—

Fig. 1 is a side elevation of my device as mounted upon a truck showing the bucket in transport position in full lines and as deposited on the ground in dot-dash lines.

Fig. 2 is an enlarged fragmentary horizontal section, taken substantially along the line 2—2 in Fig. 3, showing one cable guiding and retaining mechanism.

Fig. 3 is an enlarged side elevation of my device alone and as removed from the truck, the bucket being shown in full lines in a partially lowered position and in dot-dash lines in a dumping position.

Fig. 4 is a plan view of the device as shown in Fig. 3.

Fig. 5 is a still further enlarged and fragmentary side elevation of a forward portion of the device showing the controls and their connections to operating parts, the near or adjacent lateral parts such as frame sides and posts, boom carrying arms and the like being removed to better show the parts near the center of the device.

Fig. 6 is an enlarged vertical cross section along the line 6—6 in Fig. 1.

Fig. 7 is an enlarged, vertical and longitudinal section through the transmission device used for controlling and actuating the winch.

The material handling device constituting my invention is mounted upon a conventional motor truck designated generally at A which requires very little alteration to accommodate the device. The truck of course has the usual power take off B with control rod C by which it may be engaged with the truck engine. The truck frame has its usual side channels D which, in accordance with the invention, are cut off immediately to the rear of the rear truck wheels E. The various controls for my device are located within the truck cab F convenient to the hand of the driver.

Turning now to the device constituting my invention, I provide a base or mounting frame represented generally at 10 having side members or sills 11 longitudinally arranged and so spaced that they will rest upon the truck frame channels D from near the cab F to the cut off rear ends as shown. Wood filler strips 12 are placed between the side members 11 and channels D and a rear hold down clamp angle 13 and forwardly arranged U-bolts 14 rigidly secure the frame 10 upon the truck.

Erected atop the frame 10 at the forward ends of the sills or members 11 are the posts 15 and these posts are rigidly braced by rearwardly and downwardly extending braces 15a which are secured, as by welding, to and between the posts and sills. Front and rear spaced pairs of boom supporting arms or beams 16 and 17 are provided and they are arranged in substantially parallel positions atop the forward end of the frame 10. The lower ends of the forward arms 16 are pivotally mounted at 18 upon a transverse axis near the lower ends of the posts 15 and the lower ends of the rear arms 17 are similarly pivoted at 19 upon a transverse axis located rearwardly and somewhat below the axis of the pivots 18. The upper ends of the arms 16 and 17 are then received between the spaced plates 20 of the sides 21 of a boom or hanger 22 and pivot pins 23 and 24 connect the arms to the boom sides on transversely extending axes. These pivots 23—24 are located substantially the same distance from the respective lower pivots 18—19 so that the arms 16 and 17 at all times remain substantially parallel. The sides 21 of the boom have their respective parallel plates 20 connected by apertured ribs or webs 25 and the sides are further joined to each other by rear and front tubular cross members 26—27 with braces 28 (Fig. 4) so arranged as to afford complete rigidity to the boom as a whole. Sheave mounting and bumper plates 29 are secured rigidly at outer ends of the rear cross member 26 which is extended some distance (Fig. 4) endwise beyond the sides of the boom for a purpose which will later appear.

It will be evident that the boom 22 as thus carried on the arms 16 and 17 may be swung forwardly or rearwardly in a vertical plane over the base 10 and, due to the "parallel lever" operation of the arms, the boom will itself maintain an approximately horizontal position as it is thus moved. The weight disposition of the parts, particularly of the boom as it overhangs to the rear, normally tends to swing the arms 16 and 17 toward the rear as will be understood. This mechanism, with the addition of certain cables and parts yet to be described, constitutes the lift device for lifting, lowering, and handling the material as will presently appear.

A power winch 30 is mounted on the base 10 adjacent the forward end thereof and includes the cable drums 31—32 (Fig. 4) at each end which are supported upon a cross shaft 33 journaled through transversely spaced bearings 34. One of said bearings encloses the worm driven winch mechanism itself which is of conventional construction and includes a forwardly extending drive or worm shaft 35. Mounted immediately beneath this winch mechanism is a transmission mechanism, represented generally at 36, which is operated from the power take off B and which has a forwardly projecting drive shaft 37. Gears 38 and a sprocket chain 39 connect the shafts 35 and 37 to drive the winch as will presently appear.

Cables 40 are wound at one end on the drums 31—32, being guided therearound by cable retaining rollers 31a, and extend upwardly therefrom over sheaves 42 journaled upon a cross shaft 43 near the upper ends of the posts 15, the cables extending then upwardly over sheaves 44 mounted concentrically with the upper forward arm pivots 23 upon the forward cross member 27 of the boom. The cables then run outwardly over horizontally disposed sheaves 45 mounted near rear ends of the boom sides 21 and thence over similar sheaves 46 and downwardly through and over sheaves 47 mounted on and between the mounting plates 29 hereinbefore described. The ends of the cables then pass through fall blocks 48 and are anchored at 49 to said plates 29. The arrangement thus obviously is such that rotation of the drums 31—32 in one direction will unwind the cables and lower the fall blocks 48 while opposite movement will wind up the cables and raise the fall blocks. This movement may continue until the fall blocks contact the bumper pads 50 on lower sides of the plates 29 after which continuation of the movement will pull forwardly upon upper ends of the arms 16—17 to swing them forwardly to their substantially erect position. Such forward movement of the arms is limited by contact of stop pads 51 on the forward arms with bumper springs 52 secured to the braces 15a. These springs, of the expansion coil type, are mounted by pins 53 upon a channel shaped cross member 54 rigidly mounted between the braces. Of course as the arms thus reach their forwardmost position the pulling action of the cables 40 is brought to a halt as will hereinafter be described.

The winch 30 also includes a brake mechanism 56 which is arranged on the shaft 33 between the bearings 34 and includes a drum 57 on which one end of a cable 58 is wound. This cable is then carried upwardly and rearwardly over a pulley 59 located medially on the shaft 43 and at its end is connected by a collar 60 to the forward cross member 27 of the boom 22. The brake mechanism 56, when released, will permit the drum 57 to pay out the cable thus allowing the arms 16—17 and the boom to swing rearwardly. The drum, however, is spring set to normally rotate in the opposite direction and thus, as the arms and boom are pulled forwardly by the cables 40 the cable 58 will be automatically rewound upon the drum, the cable meanwhile being kept taut in any position of the boom as will be understood.

The bucket or skip 61 has the open top 62 and rounded bottom 63 and all sides and ends are sloped so that a number of buckets may be nested for shipping. At the ends of the bucket brackets 64 carry transversely axised pins 65 and the fall blocks 48 have depended hooks 66 which may be readily engaged with or disengaged from these pins. Cradles or base frames 67 are secured to end portions of the bucket bottom to act as rests and hold the bucket upright when it sets on the ground, but these cradles are so spaced (transversely) that they will clear the side members 11 of the base 10 when the bucket is raised.

The rear end portons of the side members 11 are higher than the forward ends and thus form bucket rests or sills 68 which are rounded and slope off rearwardly upon their upper surfaces as designated at 69. The end portions of the rounded bottom 63 of the bucket 61 may rest on these sills 68 when the bucket is in transport position (Fig. 1) and in this position the boom 22 is pulled as far forward as possible and clears the bucket (in an upward direction) by a substantial distance as clearly shown.

The bucket, due to its rounded bottom and considerable overhang at its rear edge, will have a tendency when thus rested on the sills 68 to tip over or roll rearwardly upon the sloping surfaces 69 and this action is normally prevented by engagement of the fingers 70 of latches 71 with the rearwardly and downwardly turned hooks or lips 72 formed near the ends of the bucket and on the rear edge of the same. These latches 71 are carried on a shaft 73 journaled transversely through the rear arm 17 and normally the fingers 70 are urged upwardly into engaged position by a coil spring 74. A pull on a short operating arm 75 on the shaft 73, however, will oscillate the latches to pull the fingers downwardly clear of the lips 72 and the bucket may then roll rearwardly as described. The fingers 70 are tapered on upper extremities to facilitate their proper engagement with the lips 72 as the bucket is lowered into transport position.

To permit the bucket to roll rearwardly the cables 40 must of course be loosened, and when this is done the bucket may be tipped over to the position shown in broken lines in Fig. 3. In this action the bucket has a tendency to slide downwardly and rearwardly on the sills and, to prevent it from falling, lugs 76 and 77 are provided on its bottom for engagement successively with cross bars 78 and 79 extended horizontally between the sills.

The transmission mechanism 36 has a lower drive shaft 80 journaled from front to rear and which at a forward end is connected through a suitable shaft 81 and universal coupling 82 to the power take off B to be driven by the truck engine. As shown in Fig. 7 clutches 83 are arranged on this shaft 80 and by means of a shifting fork 84 the shaft may thus be connected to drive either a gear 85 or a sprocket 86 arranged on opposite ends of the shaft. The gear 85 meshes with a similar gear 87 on the upper shaft 37 while the sprocket 86 is connected by a chain 88 with a sprocket 89 on shaft 37. By shifting the fork 84 the shaft 37 may thus be driven in either the same or opposite direction as the shaft 80 rotates and in a central position the clutch 83 will be completely released to disconnect shaft 37 from the driving mechanism. The fork 84 is carried by a transversely axised shaft 90 to one outer end of which is affixed a lever 91.

The controls for the various operating parts of my device are arranged in the truck cab F convenient to the hand of the driver and comprise first a brake lever 92 having manually releasable pawl engagement with a quadrant 93 and connected by a brake link 94 to the operating lever 95 of the brake mechanism 56. A group control 96 is also provided and comprises three telescopically arranged shafts 97, 98, and 99 journaled in an upright position in a bracket 96a in the cab and provided with radially projecting hand levers 100, 101, and 102 at their upper ends. The lever 100 and innermost shaft 97 operate the power take off control rod D while the next adjacent lever 101 and its tubular shaft 98 operate the clutch and reversing fork 84 of the transmission mechanism 36 through the connecting rod 103 as clearly shown. The lowermost lever 102 operates the bucket latches 71 through the cable 104 which runs between the arm 75 and an arm 105 on the tubular shaft 99 and over a suitably located pulley 106.

In operation, assuming the bucket 61 first to be upon the ground and loaded ready for hoisting, the truck is backed until it just clears the forward edge of the bucket. The brake lever 92 is then released to allow the brake mechanism 56 to pay out the cable 58 and at the same time the power take off C is engaged by operating hand lever 100 and the transmission 36 is actuated by control of hand lever 101 to rotate the winch drums 31—32 and pay out the cables 40. The arms 16—17 and the boom 22 are thus allowed to swing rearwardly until the boom reaches a point over the bucket and the fall blocks 48 are lowered until the hooks 66 may be engaged with the pins 65. The lever 101 is then reversed to actuate transmission 36 and rotate the drums 31—32 in the opposite direction whereupon the pull on the cables 40 will first lift the bucket directly upward, until the fall blocks 48 engage the bumper pads 50, upon which the continued pull of the cables will swing the boom 22 forwardly carrying the bucket upwardly and forwardly to a position above the sills 68. The brake lever 92 may then be used to set the brake mechanism 56 and lock the boom in this position and hand lever 101 is again reversed to loosen the cables 40 and allow the bucket to descend until it rests upon the sills 68. The latches 71, of course, are automatically engaged at this time to hold the bucket upright and the forward side of the bucket rests against rear sides of the arms 17 as clearly shown.

To return the bucket to the ground the operation is simply reversed and the bucket first lifted up to the boom, the boom swung rearwardly and the bucket then lowered from the boom.

The rear arms 17 carry a cross member or stop 107 which engages the sills 68 as the boom reaches its rearmost position and thus braces the arms for raising and lowering the bucket, this stop being in the form of a suitably shaped channel secured between the arms and angularly disposed to properly meet and rest on the sills as clearly shown in Fig. 1.

To dump the load the bucket is first lifted a short distance and the hand lever 102 operated to release the latches 71, after which the hand lever 101 is manipulated to gradually pay out the cables 40 and allow the bucket to roll rearwardly on the sills 68 as has been described. The bucket may then be righted and either lowered to the ground or returned to transport position. The brake lever 92 in this action holds the boom against movement and this lever of course permits the boom to be locked in any desired adjusted position.

The foregoing operations are straight forward and with a little practice may be carried out smoothly and rapidly to perform all desired operations with the bucket.

Attention is called to the fact that in raising the bucket it moves straight upwardly immediately to the rear of the truck until it may clear the chassis and thus eliminates as much as possible the tendency of the suspended weight to act about the rear truck wheels as a fulcrum and cause the truck to rear upward at its front end. Also, when the bucket is in transport position, the center of gravity of the load is disposed actually some distance forwardly of the rear truck axle in accordance with best transport practice.

As the boom moves forwardly in response to the pull on cables 40 the cross piece or stop 107 between the rear arms 17 engages an automatic clutch throw out mechanism designated generally at 108 which comprises an upwardly extending arm 109 secured to a shaft 110 journaled transversely between the braces 15a and a shorter, normally rearwardly turned lever 111 extended from the shaft and connected through a link 112 to a bell crank lever 113. Said lever 113 is pivoted at 114 by a transversely extending pin on the base 10 and has its depended arm 115 connected to a rod 117 extending rearwardly from the clutch operating lever 91. The upper end of the arm 109 carries a screw adjusted stop pin 118 which is engaged by the cross member or stop 107 and as the arms 18 move forwardly then toward their normal positions the arm 109 will be swung forwardly to oscillate the shaft 110 and, through the lever 111, link 112, bell crank lever 113 and rod 117, actuate the lever 91 to automatically disengage the clutch 83 and thus stop the winch automatically. The point at which this action takes place may be regulated by adjusting the stop pin 118 forwardly or rearwardly and preferably is such that the arms 17 will compress the bumper spring 52 some distance and will stand at about a 90° angle with respect to the base upon which the bucket 61 rests.

When the direction of rotation of the power take off C is opposite to that herein contemplated it will be necessary to reverse the lever 111 and turn it forwardly as shown in dotted lines in Fig. 3 in order that the forward movement of the arm 109 will properly disengage the clutch controlling the winding operation of the winch drums.

A friction brake (not shown) may be provided on the winch drive shaft 35 in order to prevent the winch from reversing after the clutch is thrown out and before the brake is applied.

Occasionally it is found necessary to pick up a load from a low position where the front wheels of the truck are actually on a higher level than the rear wheels and the truck slopes rearwardly. Ordinarily this position of the truck would aggravate the tendency of the weight of the suspended loaded bucket to tip up the forward end of the truck but in accordance with my invention I provide a safety pendulum 119 which is pivoted at its upper end 120 on the stop member 107 between the rear arms 17, and a V-shaped (in cross section) rest 121 located between the sills 68 as shown. The positions of these parts are such that, with the truck level in the fore and aft direction the pendulum will clear the rest 121 allowing the arms and boom to swing rearwardly and downwardly until the stop member 107 engages the sills as has been previously described. However, when the truck slopes rearwardly the pendulum 119 hanging free will be swung rearwardly at its lower end sufficiently to enter and engage the rest 121 and thus limit rearward movement of the boom and bring it to a stop in a position higher than usual. This then will compensate for the rearward shift of the lifting forces rearwardly as the truck slopes and will prevent the truck from rearing up as will be evident. The lower edge of the pendulum 119 is beveled off, as shown at 122, to aid in guiding it into proper engagement with the rest 121.

Obviously the bucket may be raised from or lowered into a ditch or similar depression by paying out the cables 40 to the desired amount.

The cables 40 are passed between rollers 123 which are arranged (Fig. 2) in transversely extending slots 124 in cross members 125 secured to the posts 15 above the winch. Then rollers may shift in a transverse direction as the cables spool on the drums 31—32 but their engagement with the cables will keep the same from "slapping" about and possibly overrunning as they are paid out.

The device may be used also for "bulldozing" by starting the dumping operation and carrying it out as described until the material is just beginning to fall and then releasing the brake gradually to allow the boom and bucket to lower together. Control of both the boom and bucket may be maintained with the boom brake and when the material has been completely dumped and the arms 17 rest upon the sills 68 the bucket will then be in such position that it may be used to spread the material by backing the truck. When the truck is again driven forwardly the bucket will then automatically right itself ready for loading.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A motor truck mounted material handling device comprising, a bucket for the material, arms mounted for swinging movement forwardly and rearwardly and connected to the bucket for moving the same from a rear loading position to an elevated forward transport position upon the truck, a winch connected to the arms for swinging the same, power means connected to the winch for operating the same and including a clutch means, an operating member arranged for movement by the arms as they swing forward to move the bucket to transport position, connecting means between said operating member and the clutch whereby the said movement of the member will disengage the clutch, and adjustable means on the operating member for engagement by the arms and for varying the point in the movement of said arms at which the clutch will be disengaged.

2. A portable material handling device mounted upon a wheeled frame, comprising a boom supported for swinging movement from a forward elevated position to a rear lowered position at the rear end of the frame, a bucket, means for raising the bucket from the ground to the boom in the lowered position thereof, stop means for supporting the boom while the bucket is raised, and means connected to the boom for engagement with the frame when said frame is longitudinally inclined toward one end and adapted to stop and support the boom above its normal lowermost position.

3. A portable material handling device mounted upon a wheeled frame, comprising a boom supported for swinging movement from a forward elevated position to a rear lowered position at the rear end of the frame, a bucket, means for raising the bucket from the ground to the boom in the lowered position thereof, stop means for supporting the boom while the bucket is raised, and a pendulum member connected to the boom and adapted, in response to a longitudinal inclination of the wheeled frame, to engage the said frame and stop the boom short of its lowermost position as it swings toward the rear.

4. A motor truck supported material handling device, comprising arms pivotally supported at lower ends on the truck, a boom carried at upper ends of the arms for swingable movement therewith from a forward elevated position to a lowered position at the rear of the truck, a cable for supporting the arms and boom in adjusted positions, cables running freely over the boom, fall blocks on the cables, a power operated winch for operating the last mentioned cables to raise or lower the fall blocks relative to the boom, bumper means on the boom for limiting the upward movement of the fall blocks, a material container adapted for connection to the fall blocks, and brake means for adjustably paying out the first mentioned cable to lower the arms and boom to any selected position.

5. A material handling device comprising a frame, arms pivotally mounted on the frame for swinging movement from a lowered position to a substantially erect position, a bucket, means on the arms for lifting the bucket and depositing it on the frame with one side resting adjacent the arms when they are in erect position, the said frame having sloping supports for the bucket and the bucket being rounded on its bottom to normally roll over and away from the arms to dump the contents of the bucket, and latch means carried by the arms for engaging the bucket and releasably retaining the same against said rolling movement.

6. A portable material handling mechanism mounted upon a wheel borne frame and comprising a boom, arms supporting the boom for swinging movements to and from forward elevated positions and rear lowered positions with respect to the frame, a rest member on the frame, and a pendulum member swingably connected to said arms and normally clearing said rest member as the arms swing forward and rearward but adapted to engage said rest member when the frame is sloped rearwardly due to its being positioned on an inclined surface, said pendulum member when thus engaged with the rest member being operative to stop the boom short of the limit of its normal rearward movement.

7. A motor truck mounted material handling device, comprising a bucket having a rounded bottom, rearwardly sloping and rounded members mounted in transversely spaced positions on the truck for supporting the bucket on its rounded bottom, means for raising the bucket from the ground to a transport position on the rearwardly sloping members and for permitting the bucket to roll rearwardly to a dumping position by engagement of its rounded bottom with said members, said bucket having a hook member on an upper edge portion, and latch means adapted to releasably engage said hook member to restrain the bucket against such rearward rolling movement.

8. A material handling device, comprising a frame, a boom operatively supported for swinging movements in a substantially upright plane with respect to the frame, a bucket supportably connected to the boom, said bucket having a rounded bottom, a rearwardly sloping support for the bucket upon the frame and adapted, when the bucket is rested thereon, to cant the bucket and thereby dump its contents, latch means adapted to releasably engage the bucket to hold it in upright position upon said rounded support, and remote control means for said latch means.

9. A material handling mechanism, comprising a frame, arms pivotally supported at lower ends on the frame for swinging movements in upright planes with respect thereto, a boom carried at the upper ends of the arms, a cable operatively arranged to support the arms and boom in adjusted positions, fall blocks, cables extending freely over the boom and supporting said fall blocks, a power operated winch for operating the last mentioned cables to raise and lower the fall blocks with respect to the boom, brake controlled means for paying out the first mentioned cable, and bumper means for limiting upward movement of the fall blocks.

ULYSS O. GUIGNARD.